(12) United States Patent
Sano et al.

(10) Patent No.: US 8,005,504 B2
(45) Date of Patent: Aug. 23, 2011

(54) WIRELESS COMMUNICATION APPARATUS HAVING WIRELESS COMMUNICATION FUNCTIONS CONFORMING TO INCOMPATIBLE COMMUNICATION STANDARDS

(75) Inventors: Eiichi Sano, Kanagawa (JP); Hiroyuki Fujita, Isikawa (JP)

(73) Assignee: Sony Corporation, Tokyo (JP)

(*) Notice: Subject to any disclaimer, the term of this patent is extended or adjusted under 35 U.S.C. 154(b) by 1031 days.

(21) Appl. No.: 11/560,170

(22) Filed: Nov. 15, 2006

(65) Prior Publication Data
US 2007/0129104 A1   Jun. 7, 2007

(30) Foreign Application Priority Data

Nov. 16, 2005 (JP) .................. P2005-332186

(51) Int. Cl.
*H04M 1/00* (2006.01)
(52) U.S. Cl. .................................... 455/552.1
(58) Field of Classification Search ............... 455/552.1
See application file for complete search history.

(56) References Cited

U.S. PATENT DOCUMENTS

| 6,108,313 | A  | * | 8/2000 | Lee et al. ............... 370/294 |
| 6,560,443 | B1 |   | 5/2003 | Valsanen et al. |
| 6,842,629 | B1 |   | 1/2005 | Granstam et al. |
| 2004/0185893 | A1 | * | 9/2004 | Doi et al. ............... 455/525 |
| 2006/0194600 | A1 | * | 8/2006 | Palin et al. ............. 455/512 |

FOREIGN PATENT DOCUMENTS

| JP | 63-016722 | 1/1988 |
| JP | 10-032528 | 2/1998 |
| JP | 10-215202 | 8/1998 |
| JP | 11-251952 | 9/1999 |
| JP | 2001-24579 | 1/2001 |
| JP | 2001-024579 | 1/2001 |
| JP | 2002-208874 | 7/2002 |
| JP | 2003-502931 | 1/2003 |
| JP | 2003-124853 | 4/2003 |

OTHER PUBLICATIONS

Japanese Office Action for Application No. JP 2005-332186 issued on Jan. 27, 2009.
Japanese Office Action issued on Nov. 10, 2009, for corresponding Japanese Patent Application 2005-332186.

* cited by examiner

*Primary Examiner* — Duc Nguyen
*Assistant Examiner* — Ankur Jain
(74) *Attorney, Agent, or Firm* — K&L Gates LLP

(57) ABSTRACT

A wireless communication apparatus is provided. The wireless communication apparatus includes wireless communication functions conforming to incompatible first and second communication standards. The wireless communication apparatus includes a first transceiver that performs a wireless communication operation conforming to the first communication standard and includes a first transmission/reception port, a second transceiver that performs a wireless communication operation conforming to the second communication standard and includes a second transmission/reception port, a shared antenna shared by the first and the second transceivers, an antenna connecting unit that connects the shared antenna and the first and the second transmission/reception ports, and a control unit that controls the communication operations in the first and the second transceivers.

6 Claims, 6 Drawing Sheets

WIRELESS COMMUNICATION APPARATUS HAVING WIRELESS COMMUNICATION FUNCTIONS CONFORMING TO INCOMPATIBLE COMMUNICATION STANDARDS

CROSS-REFERENCES TO RELATED APPLICATIONS

The present application claims priority to Japanese Patent Application JP 2005-332186 filed in the Japanese Patent Office on Nov. 16, 2005, the entire contents of which are being incorporated herein by reference.

BACKGROUND

The present disclosure relates to a wireless communication apparatus mounted with plural communication functions conforming to different wireless communication standards, and, more particularly to a wireless communication apparatus mounted with two different communication functions that use an identical frequency band.

More specifically, the invention relates to a wireless communication apparatus mounted with both a wireless LAN function represented by IEEE802.11 and a Bluetooth communication function, and, more particularly to a wireless communication apparatus that simultaneously uses two incompatible communication functions without causing radio interference.

The wireless LAN attracts attention as a system that releases users from LAN wiring in the wired system. As an example of the standard concerning a wireless network, there is IEEE (the Institute of Electrical and Electronics Engineers) 802.11. It is possible to perform wireless data transmission using a global radio frequency called an ISM (Industry Science Medical) band. Recently, a broadband Internet connection service that uses a Wireless LAN represented by "Hot Spot" is widely used. This makes it possible to use the Internet even in service areas provided in facilities outside homes and offices such as cafeterias, hotels, fast food restaurants, stations, and airports. Thus, the wireless LAN function is often mounted in mobile terminals such as cellular phones and PDAs (Personal Digital Assistants).

On the other hand, there is known Bluetooth communication as a standard for providing a wireless connection interface applicable to various industries. The "Bluetooth SIG (Special Interest Group)" is entrusted with operation and management of the Bluetooth communication. The Bluetooth communication is characterized by lower consumption and short distance communication, although the ISM band is used. An overall data transmission rate of the Bluetooth communication is 1 Mbps. As major applications of the Bluetooth communication, sound communication between a telephone body and a handset and transmission of audio data from audio equipment to a headphone are assumed.

Recently, there is an increasing demand for mounting of a Bluetooth communication function in the mobile terminals such as the cellular phones and the PDAs together with the wireless LAN function. With a communication terminal that has a double communication mode of the wireless LAN and the Bluetooth communication, a user can make connection to the Internet through an access point of the wireless LAN and download desired data contents and, moreover, send audio reproduction data to a headset according to the Bluetooth communication and appreciate music.

When the wireless LAN and the Bluetooth communication are mounted in the same terminal, transceiver modules of both the communication systems are basically realized as separate units independent from each other. However, it is possible to share several components such as a filter, an antenna, and an RF switch.

However, these communication standards that use the same frequency band, that is, the ISM band, do not have compatibility. Thus, when the user attempts to perform communication using both the communication standards simultaneously, the communication standards interfere with each other to cause radio interference and reception failure. In other words, when transceivers of the respective communication systems include independent antennas, a signal discharged to the air from the antenna of one transceiver is received by the antenna of the other transceiver to cause radio interference. When one transceiver outputs strong high-frequency power near the other transceiver, it is likely that an RF reception circuit of the other transceiver is permanently damaged. When both the transceivers share an antenna, if, during a period in which one transceiver is performing transmission, the other transceiver performs a reception operation, a return current is generated at a connection point for sharing the antenna to cause radio interference.

Therefore, an operation of the other transceiver has to be stopped while one transceiver is operating. Even if a terminal is mounted with both the communication functions of the wireless LAN and the Bluetooth communication, it is difficult to perform audio reproduction using the Bluetooth communication during data transmission through the wireless LAN. It is also difficult to make an Internet connection through the wireless LAN during a call that uses the Bluetooth communication. Thus, it is difficult to sufficiently enjoy the merits of the functions of the double communication For example, there is proposed a multi-transceiver mobile terminal that is mounted with both the communication functions of the wireless LAN and the Bluetooth communication and efficiently share a diversity antenna (see, for example, JP-A-2001-24579). The mobile terminal includes two diversity antennas connected in first and second antenna ports, respectively. In a Bluetooth operation mode, the second antenna port is connected to a Bluetooth-transceiver input/output port and a wireless LAN transmission/reception port is disconnected from the second antenna port. In a wireless LAN transmission mode, the wireless LAN transmission/reception port is connected to the first antenna port and the Bluetooth-transceiver input/output port is disconnected from the second antenna port. When the Bluetooth-transceiver input/output port is disconnected from the second antenna port in the wireless LAN reception mode, the wireless LAN transmission/reception port is connected to one of the antenna ports.

In other words, in this mobile terminal, high-frequency switches are combined to contrive a switching algorithm thereof, whereby sharing of the pair of diversity antennas by the respective transceivers of the wireless LAN and the Bluetooth communication is realized. However, since radio interference is prevented by changing over the high-frequency switches, a circuit is complicated and high-frequency switching units are necessary, causing an increase in cost. Further, a control circuit for controlling the high-frequency switching units and software for working the control circuit are also necessary, resulting in an increase in size of an overall system. Moreover, since communication modules connected to the antennas are selected by changing over the switches, during operation of one communication function, the other communication function may have to be stopped.

SUMMARY

Therefore, it is desirable to provide an excellent wireless communication apparatus that can be suitably mounted with two different communication functions that use an identical frequency band like the wireless LAN represented by IEEE802.11 and the Bluetooth communication.

It is also desirable to provide an excellent wireless communication apparatus that can be suitable mounted with two incompatible communication functions like the wireless LAN represented by IEEE802.11 and the Bluetooth communication and can simultaneously use the two communication functions without causing radio interference.

According to a first embodiment, there is provided a wireless communication apparatus mounted with wireless communication functions conforming to incompatible first and second communication standards. The wireless communication apparatus includes a first transceiver that performs a wireless communication operation conforming to the first communication standard and includes a first transmission/reception port for inputting and outputting transmission and reception signals, a second transceiver that performs a wireless communication operation conforming to the second communication standard and includes a second transmission/reception port for inputting and outputting transmission and reception signals, a shared antenna shared by the first and the second transceivers for transmission and reception, an antenna connecting unit that connects the shared antenna and the first and the second transmission/reception ports, and a control unit that controls the communication operations in the first and the second transceivers. The antenna connecting unit substantially equally distributes reception power in the shared antenna to the first and the second transmission/reception ports, substantially equally distributes transmission power from the first transmission/reception port to the shared antenna and the second transmission/reception port and, then, cancels the power distributed to the second transmission/reception port, and substantially equally distributes transmission power from the second transmission/reception port to the shared antenna and the first transmission/reception port and, then, cancels the power distributed to the first transmission/reception port. The control unit switches, during a period in which one transceiver is performing transmission, the other transceiver to a reception operation.

The first communication standard is, for example, IEEE802.11. The second communication standard is the Bluetooth communication that uses the same ISM band as the first communication standard but is incompatible with the first communication standard.

In such a case, the two communication systems use the same frequency band, that is, the ISM band but do not have compatibility. Thus, when the user attempts to perform communication using both the communication systems simultaneously, the communication systems interfere with each other to cause radio interference and reception failure. When one transceiver outputs strong high-frequency power near the other transceiver, it is likely that an RF reception circuit of the other transceiver is permanently damaged. Thus, during operation of one transceiver, the other transceiver has to be stopped.

On the other hand, in the wireless communication apparatus according to the first embodiment, the first transceiver and the second transceiver that do not have compatibility in the communication standards are connected to the shared antenna via the antenna connecting unit designed to have an isolation characteristic. This makes it possible to simultaneously operate both the transceivers at low cost and easily without completely stopping the function of one of the transceivers.

For example, a reception operation performed by the second transceiver during a period in which the first transceiver is performing transmission will be considered. When a transmission signal transmitted by the first transceiver is outputted from the first transmission/reception port, transmission power of the transmission signal is substantially equally distributed to the shared antenna and the second transmission/reception port by the antenna connecting unit and the transmission signal is discharged to the air from the shared antenna. Since the transmission power distributed to the second transmission/reception port is cancelled, radio interference is not caused in the second transceiver. In this case, the transmission power from the first transceiver is reduced by half when the transmission power is distributed by the antenna connecting unit (e.g., the transmission power is reduced by about 3 dB). However, it is possible to simultaneously operate the transceivers according to the incompatible two communication standards using a circuit configuration realized easily and at low cost.

When a radio signal from another wireless communication apparatus conforming to the second communication standard is received by the shared antenna, reception power of the radio signal is substantially equally distributed to the first and the second transmission/reception ports by the antenna connecting unit. Thus, it is possible to perform reception processing using the second transceiver.

It goes without saying that, when the first transceiver is performing a reception operation during a period in which the second transceiver is performing transmission, it is also possible to simultaneously operate the first and the second transceivers.

It is possible to implement such an antenna connecting unit having the isolation characteristic using, for example, a Wilkinson-type power divider/combiner and a directional coupler.

The first transceiver may include a first antenna for selective diversity reception connected through a first reception port. The second transceiver may include a second antenna for selective diversity reception connected through a second reception port. In such a case, the first transceiver can perform a selective diversity reception operation using the two antennas, that is, the first antenna for selective diversity reception and the shared antenna. Similarly, the second transceiver can perform a selective diversity reception operation using the second antenna for selective diversity reception.

However, when one transceiver is performing such a selective diversity reception operation, if the other transceiver performs transmission processing, one of radio signals discharged to the air from the shared antenna is received by the antenna for selective diversity reception of one transceiver to cause radio interference.

Thus, when the control unit detects that the other transceiver is performing the transmission processing, the control unit causes one transceiver to perform the selective diversity reception operation for setting the shared antenna having the isolation characteristic as a reception antenna of one transceiver. This makes it possible to prevent radio interference and realize the simultaneous operation as described above.

According to a second embodiment, there is provided a wireless communication apparatus that is mounted with wireless communication functions conforming to incompatible first and second communication standards and performs diversity transmission and reception. The wireless communication apparatus includes first and second shared antennas, a first transceiver that performs a wireless communication operation conforming to the first communication standard, includes two transmission/reception ports for inputting and outputting transmission and reception signals to and from the first and the second shared antennas, respectively, and is capable of performing the diversity transmission and reception operation, a second transceiver that performs a wireless communication operation conforming to the second communication standard, includes two transmission/reception ports for inputting and outputting transmission and reception signals to and from the first and the second shared antennas, respectively, and is capable of performing the diversity transmission and reception operation, first and second antenna connecting units that connect the first and the second shared antennas and the first and the second transmission/reception ports, respectively, and a control unit that controls the communication operations in the first and the second transceivers. The respective antenna connecting units substantially equally distribute reception power in the shared antennas to the first and the second transmission/reception ports of the first and the second transceivers corresponding to the shared antennas, substantially equally distribute transmission power from the first transceiver side to the shared antennas and the transmission/reception ports of the second transceiver corresponding to the shared antennas and, then, cancel the power distributed to the second transceiver side, and substantially equally distribute transmission power from the second transceiver side to the shared antennas and the transmission/reception ports of the first transceiver corresponding to the shared antennas and, then, cancel the power distributed to the first transceiver side. The control unit switches, during a period in which one transceiver is performing transmission using one shared antenna, the other transceiver to a reception operation in which the other shared antenna is used.

The first communication standard is, for example, IEEE802.11. The second communication standard is the Bluetooth communication that uses the same ISM band as the first communication standard but is incompatible with the first communication standard.

The wireless communication apparatus according to the second embodiment is mounted with the wireless communication functions conforming to the incompatible first and second communication standards and includes the first and the second shared antennas. Both the first and the second transceivers include the two transmission/reception ports for inputting and outputting transmission and reception signals to and from the first and the second shared antennas and are capable of performing the diversity transmission and reception operation.

However, the two communication systems use the same frequency band, that is, the ISM band but do not have compatibility. Thus, when the user attempts to perform communication using both the communication systems simultaneously, the communication systems interfere with each other to cause radio interference and reception failure. When one transceiver outputs strong high-frequency power near the other transceiver, it is likely that an RF reception circuit of the other transceiver is permanently damaged. Thus, during operation of one transceiver, the other transceiver has to be stopped.

On the other hand, in the wireless communication apparatus according to the second embodiment, the respective transmission/reception ports of the first and the second transceivers are connected to the first and the second shared antennas via the first and the second antenna connecting units designed to have an isolation characteristic. This makes it possible to simultaneously operate both the transceivers at low cost and easily without completely stopping the function of one of the transceivers.

For example, a reception operation performed by the second transceiver using the second shared antenna during a period in which the first transceiver is performing transmission using the first shared antenna will be considered. Transmission power of a transmission signal transmitted by the first transceiver is substantially equally distributed to the first shared antenna and the second transceiver by the first antenna connecting unit and the transmission signal is discharged to the air from the shared antenna. Since the transmission power distributed to the second transceiver side is cancelled, radio interference is not caused in the second transceiver. In this case, the transmission power from the first transceiver is reduced by half when the transmission power is distributed by the antenna connecting unit (e.g., the transmission power is reduced by about 3 dB). However, it is possible to simultaneously operate the transceivers according to the incompatible two communication standards using a circuit configuration realized easily and at low cost.

When a radio signal from another wireless communication apparatus conforming to the second communication standard is received by the second shared antenna, reception power of the radio signal is substantially equally distributed to the first and the second transceivers by the second antenna connecting unit. Thus, it is possible to perform reception processing using the second transceiver.

When the first transceiver is performing a reception operation during a period in which the second transceiver is performing transmission, it is also possible to simultaneously operate the first and the second transceivers.

It is possible to implement such an antenna connecting unit having the isolation characteristic using, for example, a Wilkinson-type power divider/combiner and a directional coupler (as described above).

Other objects and characteristics will be apparent from more detailed explanations based on embodiments described below and drawings attached hereto.

Additional features and advantages are described herein, and will be apparent from, the following Detailed Description and the figures.

DETAILED DESCRIPTION

Embodiments will be hereinafter explained with reference to the accompanying drawings.

According to an embodiment, there is provided a wireless communication apparatus mounted with two different communication functions that use an identical frequency band like the wireless LAN represented by IEEE802.11 and Bluetooth communication. The wireless LAN represented by IEEE802.11 and the Bluetooth communication are incompatible communication standards. However, the wireless communication apparatus according to the embodiment of the invention simultaneously uses the two communication functions without causing radio interference.

Figure 1:
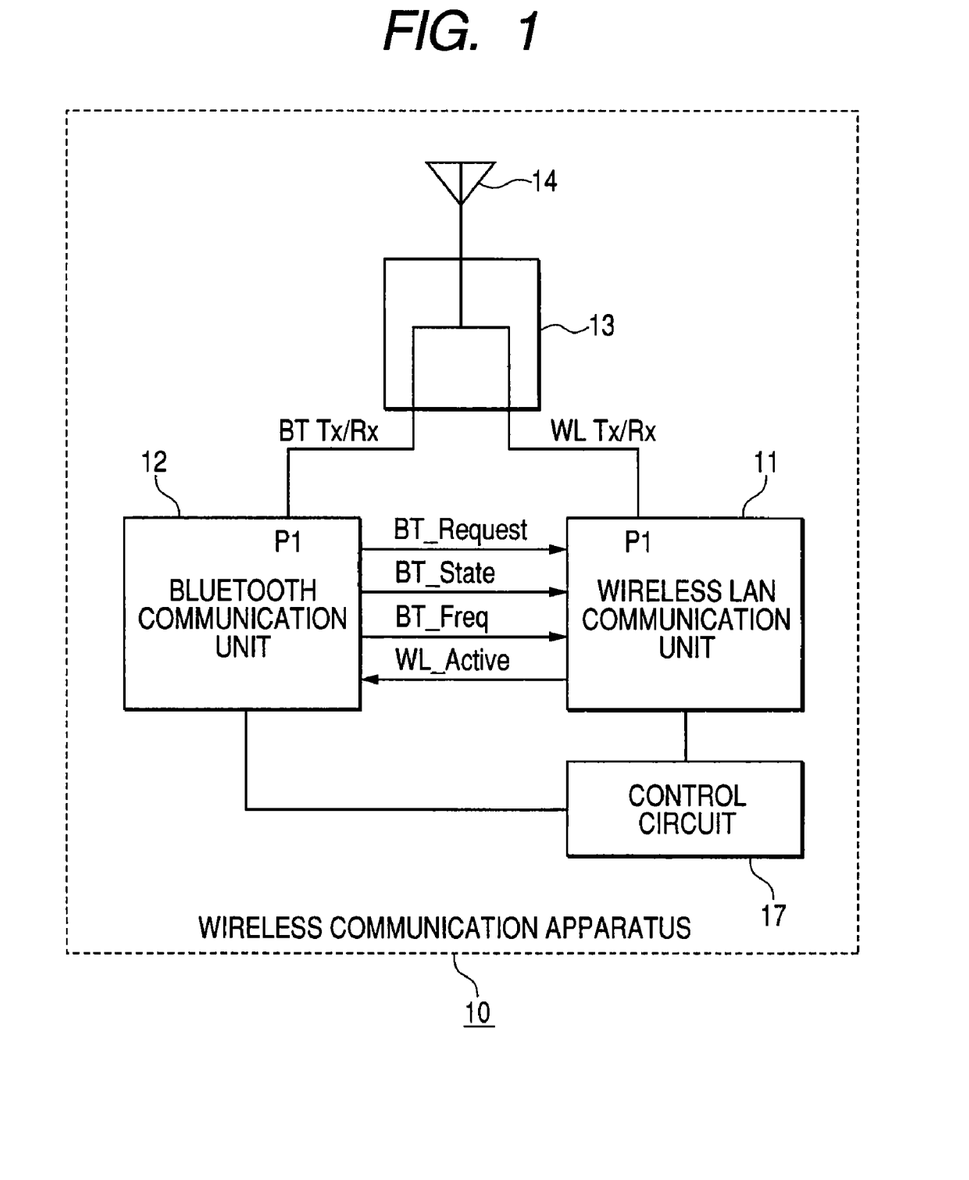
FIG. 1 is a diagram schematically showing a hardware configuration of a wireless communication apparatus according to an embodiment.

A hardware configuration of a wireless communication apparatus according to an embodiment is schematically shown in FIG. 1.

A wireless communication apparatus 10 shown in the figure includes a wireless LAN communication unit 11 that performs transmission and reception operations conforming to IEEE802.11, a Bluetooth communication unit 12 that performs transmission and reception operations conforming to the Bluetooth communication, and a control circuit 17 that controls the communication operations in both the communication units 11 and 12. The wireless communication apparatus 10 can be mounted in a mobile terminal (not shown) such as a cellular phone or a PDA as, for example, a communication module.

Signal lines allowing the wireless LAN communication unit 11 and the Bluetooth communication unit 12 to recognize states thereof each other are connected between the communication units 11 and 12. BT_Request is a signal line through which the Bluetooth communication unit 12 requests the wireless LAN communication unit 11 to start a Bluetooth communication operation. BT_State is a signal line for notifying the wireless LAN communication unit 11 of a communication state in the Bluetooth communication unit 12. BT_Freq is a signal line for notifying the wireless LAN communication unit 11 of a hopping frequency presently used in the Bluetooth communication unit 12. WL_Active is a signal line for notifying the Bluetooth communication unit 12 of an activity of a communication operation in the wireless LAN communication unit 11. Note that, operations based on these signal lines explained in detail below.

The wireless LAN communication unit 11 and the Bluetooth communication unit 12 include transmission/reception ports P1 for high-frequency input and output, respectively. These transmission/reception ports P1 are connected to one shared antenna 14 via a power divider/combiner 13.

The power divider/combiner 13 is, for example, a power divider/combiner of the Wilkinson type. The power divider/combiner 13 is designed to have an isolation characteristic between the wireless LAN communication unit 11 and the Bluetooth communication unit 12. Specifically, the power divider/combiner 13 substantially equally distributes reception power in the shared antenna to the respective transmission/reception ports P1 of the wireless LAN communication unit 11 and the Bluetooth communication unit 12, substantially equally distributes transmission power from the transmission/reception port P1 of the wireless LAN communication unit 11 to the shared antenna 14 and the transmission/reception port P1 of the Bluetooth communication unit 12, and, then, cancels the power distributed to the transmission/reception port P1 of the Bluetooth communication unit 12. The power divider/combiner 13 substantially equally distributes transmission power from the transmission/reception port P1 of the Bluetooth communication unit 12 to the shared antenna 14 and the transmission/reception port P1 of the wireless LAN communication unit 11 and, then, cancels the power distributed to the transmission/reception port P1 of the wireless LAN communication unit 11.

The control circuit 17 switches, during a period in which one transceiver is performing transmission, the other transceiver to a reception operation.

For example, a reception operation performed by the Bluetooth communication unit 12 during a period in which the wireless LAN communication unit 11 is performing transmission will be considered. Transmission power of a transmission signal transmitted by the wireless LAN communication unit 11 is substantially equally distributed to the shared antenna 14 and the transmission/reception port P1 of the Bluetooth communication unit 12 by the power divider/combiner 13. The transmission signal is discharged to the air from the shared antenna 14. Since the power distributed to the transmission/reception port P1 of the Bluetooth communication unit 12 is cancelled, radio interference is not caused in the Bluetooth communication unit 12. In this case, the transmission power from the wireless LAN communication unit 11 is reduced by half when the transmission power is distributed by the power divider/combiner 13 (e.g., the transmission power is reduced by about 3 dB). However, it is possible to simultaneously operate the wireless LAN communication unit 11 and the Bluetooth communication unit 12 according to the incompatible two communication standards using a circuit configuration realized easily and at low cost.

When a Bluetooth communication signal from another wireless communication apparatus is received by the shared antenna 14, reception power of the Bluetooth communication signal is substantially equally distributed to the transmission/reception ports P1 of the wireless LAN communication unit 11 and the Bluetooth communication unit 12 by the power divider/combiner 13. Thus, it is possible to perform reception processing using the Bluetooth communication unit 12.

It goes without saying that, when the wireless LAN communication unit 11 is performing a reception operation during a period in which the Bluetooth communication unit 12 is performing transmission, it is also possible to simultaneously operate both the communication units 11 and 12.

Figure 2:
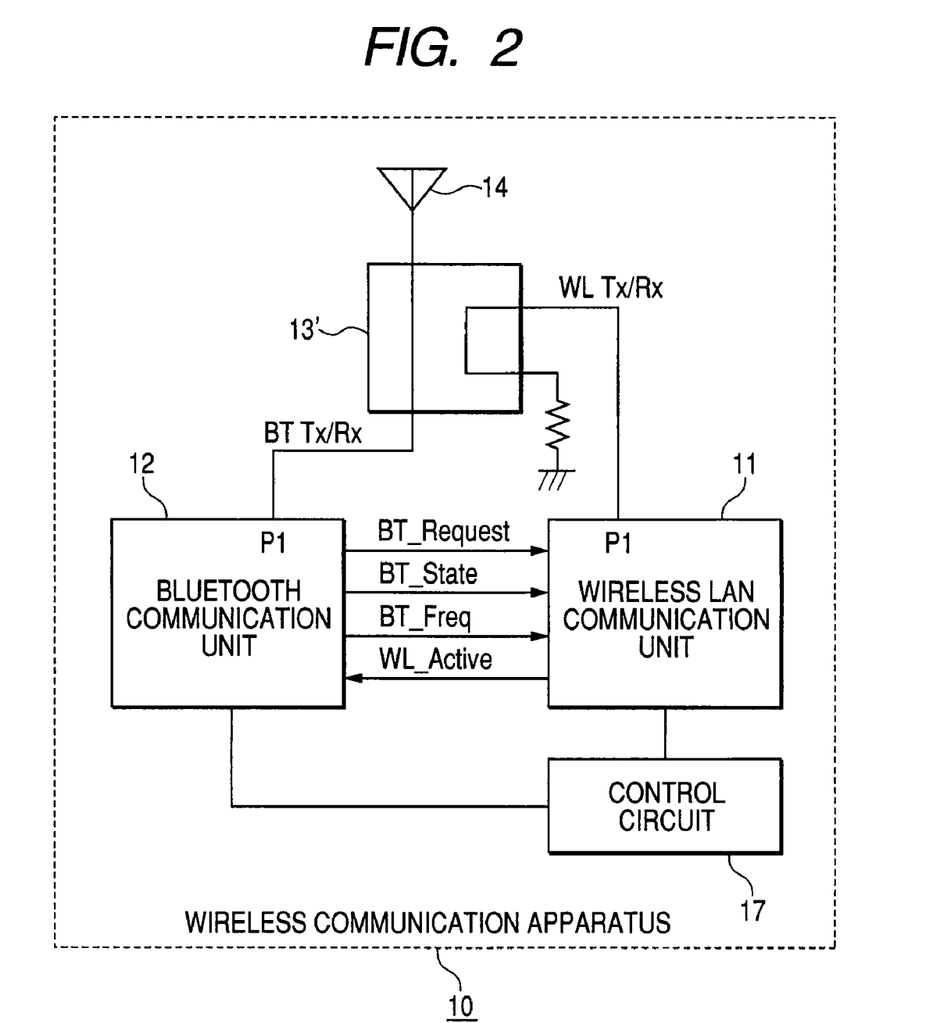
FIG. 2 is a diagram showing a modification of the wireless communication apparatus in FIG. 1 in which a directional coupler is used for connection of a shared antenna and respective transceivers.

As a device for connecting the wireless LAN communication unit 11 and the Bluetooth communication unit 12 to the shared antenna 14 to have the isolation characteristic between the communication units 11 and 12, it is also possible to use a directional coupler 13' other than the Wilkinson-type power divider/combiner 13. An example of a structure of the wireless communication apparatus 10 in this case is illustrated in FIG. 2. A coupling operation for transmission and reception power by the directional coupler 13' is substantially equivalent to power distribution and combination actions by the power divider/combiner 13. Operations of the wireless LAN communication unit 11, the Bluetooth communication unit 12, and the control circuit 17 are the same as those described above. Thus, further explanations of the operations are omitted.

Figure 3:
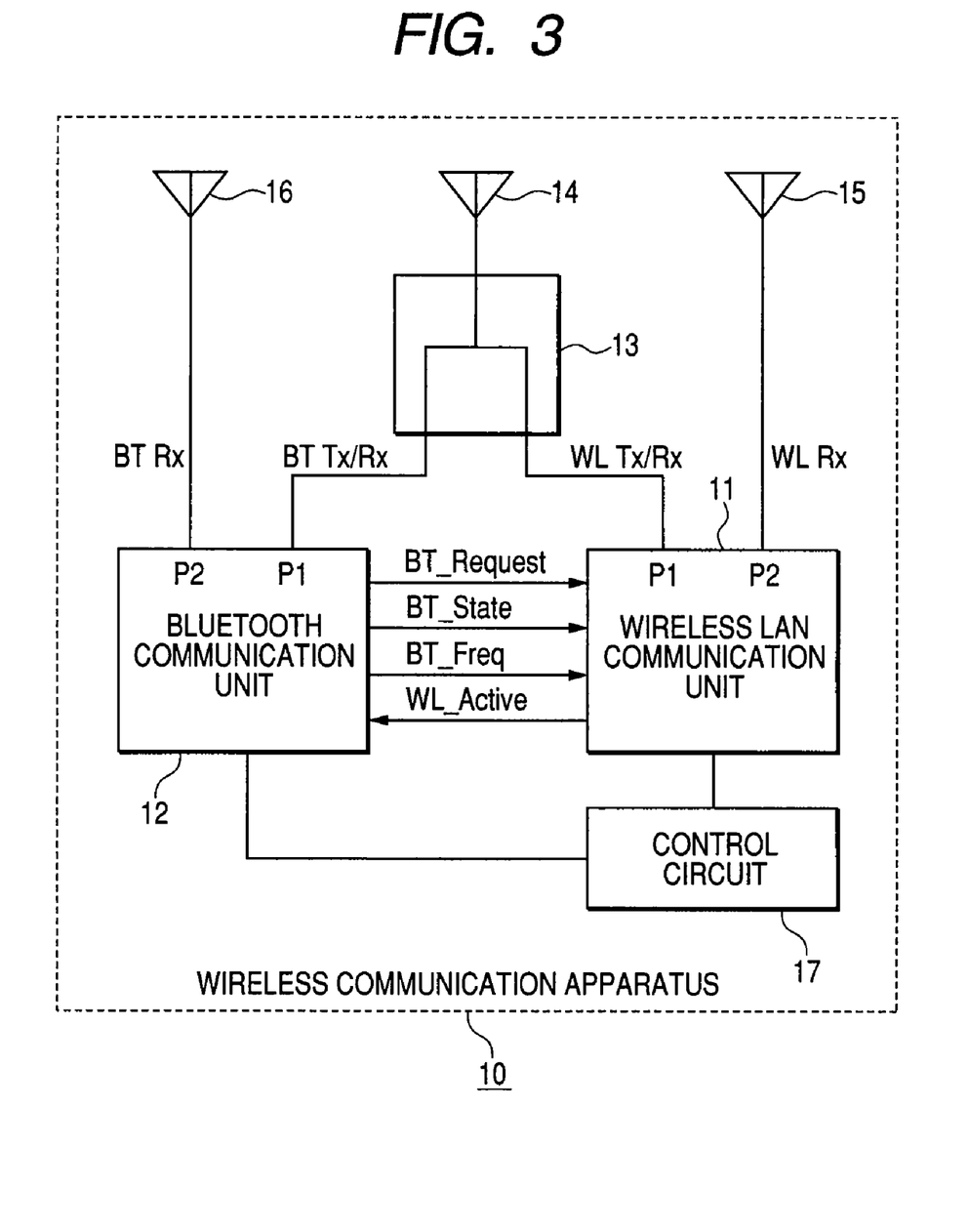
FIG. 3 is a diagram schematically showing a hardware configuration of a wireless communication apparatus according to another embodiment.

A hardware configuration of a wireless communication apparatus according to another embodiment of the invention is schematically illustrated in FIG. 3.

The wireless communication apparatus 10 illustrated in the figure includes the wireless LAN communication unit 11 that performs transmission and reception operations conforming to IEEE802.11, the Bluetooth communication unit 12 that performs transmission and reception operations conforming to Bluetooth communication, and the control circuit 17 that controls the communication operations in both the communication units 11 and 12. The same signal lines as above allowing the wireless LAN communication unit 11 and the Bluetooth communication unit 12 to recognize states thereof each other are connected between the communication units 11 and 12.

The wireless LAN communication unit 11 and the Bluetooth communication unit 12 include transmission/reception ports P1 for inputting and outputting high-frequency waves and reception ports P2 for inputting high-frequency waves, respectively. The transmission/reception ports P1 are connected to one shared antenna 14 via the power divider/combiner 13. The reception ports P2 of the respective communication units 11 and 12 are connected to reception antennas 15 and 16 for selective diversity reception, respectively. Both the wireless LAN communication unit 11 and the Bluetooth communication unit 12 can perform a selective diversity reception operation using the reception antennas 15 and 16 for selective diversity reception and the shared antenna 14.

The power divider/combiner 13 is, for example, a power divider/combiner of the Wilkinson type. The power divider/combiner 13 is designed to have an isolation characteristic between the wireless LAN communication unit 11 and the Bluetooth communication unit 12. Specifically, the power divider/combiner 13 substantially equally distributes reception power in the shared antenna 14 to the respective transmission/reception ports P1 of the wireless LAN communication unit 11 and the Bluetooth communication unit 12, substantially equally distributes transmission power from the transmission/reception port P1 of the wireless LAN communication unit 11 to the shared antenna 14 and the transmission/reception port P1 of the Bluetooth communication unit 12, and, then, cancels the power distributed to the transmission/reception port P1 of the Bluetooth communication unit 12. The power divider/combiner 13 substantially equally distributes transmission power from the transmission/reception port P1 of the Bluetooth communication unit 12 to the shared antenna 14 and the transmission/reception port P1 of the wireless LAN communication unit 11 and, then, cancels the power distributed to the transmission/reception port P1 of the wireless LAN communication unit 11.

When one transceiver is performing the selective diversity reception operation, if the other transceiver performs transmission processing, one of radio signals discharged to the air from the shared antenna is received by the antenna for selective diversity reception of one transceiver to cause radio interference. When one transceiver outputs a high-frequency power signal near the other transceiver, it is likely that a reception unit of the other transceiver is permanently damaged. Thus, when the control circuit 17 detects that the other transceiver is performing the transmission processing, the control circuit 17 causes one transceiver to perform the selective diversity reception operation for setting the shared antenna, which has the isolation characteristic, as a reception antenna of one transceiver. This makes it possible to prevent radio interference and realize the simultaneous operation as described above.

When the wireless LAN communication unit 11 is outputting a high-frequency signal on a specific channel to another wireless communication apparatus, the control circuit 17 detects the signal and sets a reception antenna of the Bluetooth communication unit 12 in the transmission/reception port P1. Consequently, the Bluetooth communication unit 12 is capable of receiving a transmission signal from another Bluetooth communication apparatus. Since the power divider/combiner 13 has the isolation characteristic between the wireless LAN communication unit 11 and the Bluetooth communication unit 12, even if the wireless LAN communication unit 11 outputs the high-frequency signal from the transmission/reception port P1, a reception function of the Bluetooth communication unit 12 is not permanently damaged. It is possible to reduce a degree of reception interference.

On the other hand, when the Bluetooth communication unit 12 is outputting a high-frequency signal on a specific channel to another wireless communication apparatus, the control circuit 17 detects the signal and sets a reception antenna of the wireless LAN communication unit 11 in the transmission/reception port P1. Consequently, the wireless LAN communication unit 11 is capable of receiving a transmission signal from another wireless LAN communication apparatus. Since the power divider/combiner 13 has the isolation characteristic between the wireless LAN communication unit 11 and the Bluetooth communication unit 12, even if the Bluetooth communication unit 12 outputs the high-frequency signal from the transmission/reception port P1, a reception function of the wireless LAN communication unit 11 is not permanently damaged. It is possible to reduce a degree of reception interference.

Figure 4:
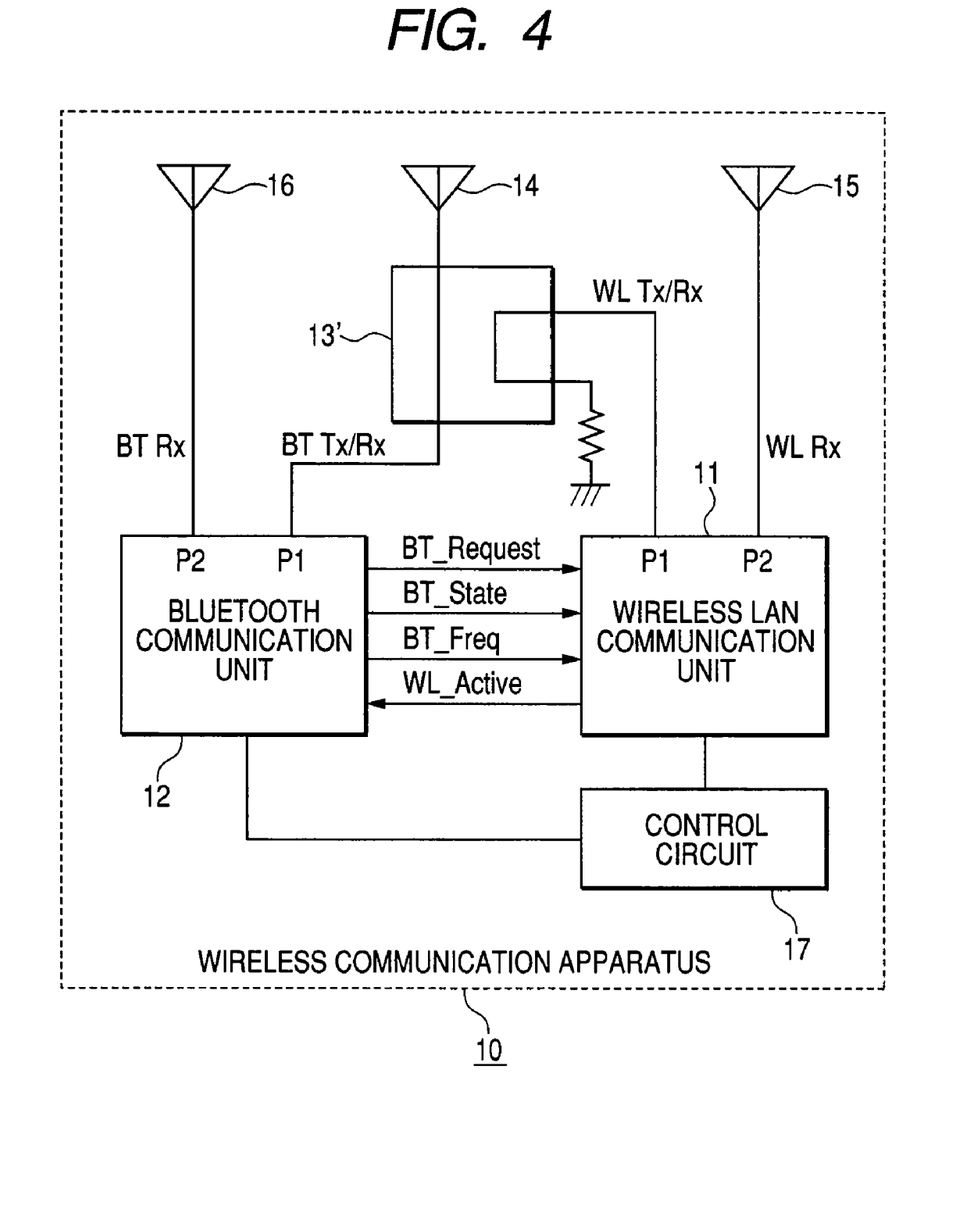
FIG. 4 is a diagram showing a modification of the wireless communication apparatus in FIG. 3 in which a directional coupler is used for connection of a shared antenna and respective transceivers.

As a device for connecting the wireless LAN communication unit 11 and the Bluetooth communication unit 12 to the shared antenna 14 to have the isolation characteristic between the communication units 11 and 12, it is also possible to use a directional coupler 13' other than the Wilkinson-type power divider/combiner 13. An example of a structure of the wireless communication apparatus 10 in this case is shown in FIG. 4. A coupling operation for transmission and reception power by the directional coupler 13' is substantially equivalent to power distribution and combination actions by the power divider/combiner 13. Operations of the wireless LAN communication unit 11, the Bluetooth communication unit 12, and the control circuit 17 are the same as those described above. Thus, further explanations of the operations are omitted.

Figure 5:
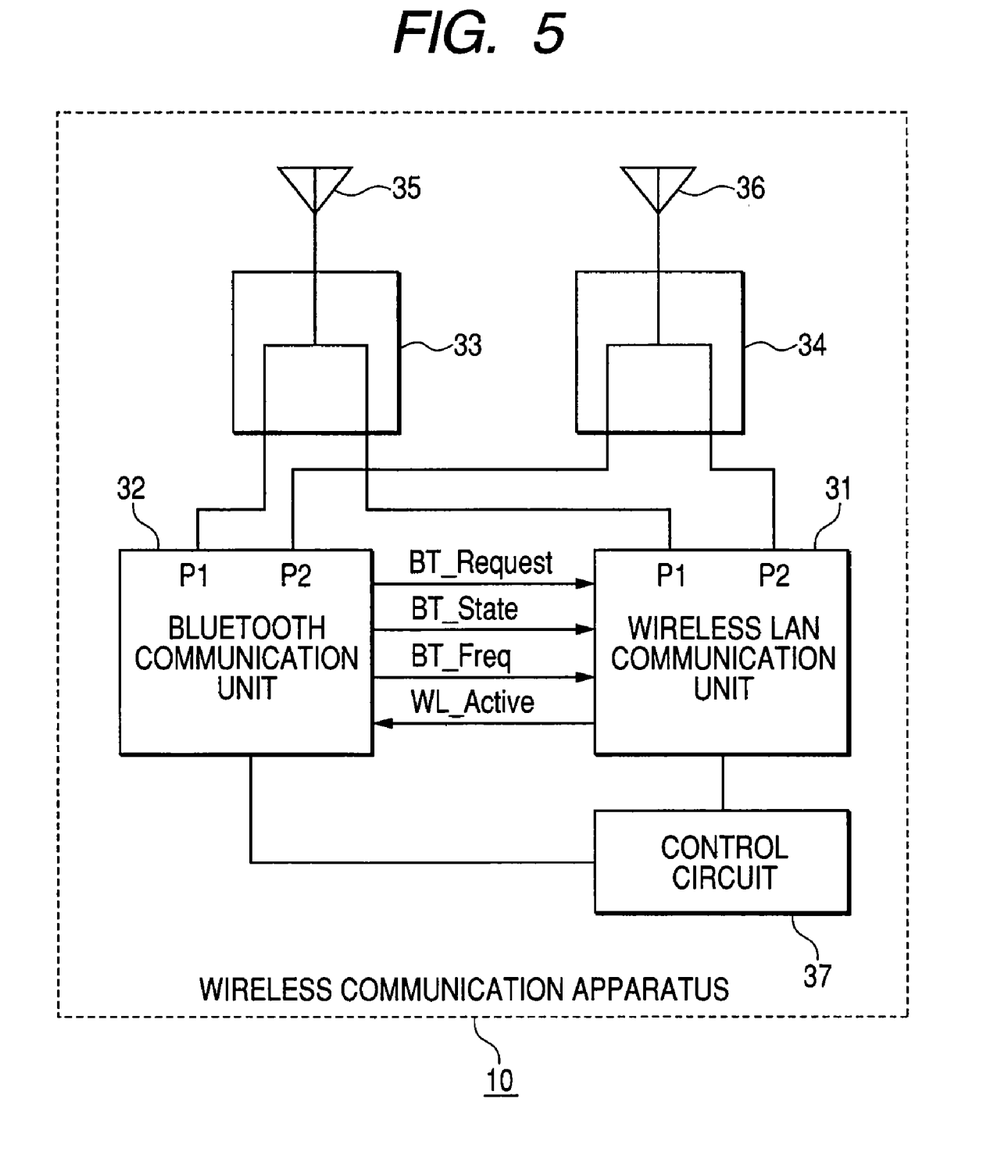
FIG. 5 is a diagram schematically showing a hardware configuration of a wireless communication apparatus according to still another embodiment.

A hardware configuration of a wireless communication apparatus according to another embodiment is schematically illustrated in FIG. 5.

The wireless communication apparatus 10 illustrated in the figure includes a wireless LAN communication unit 31 that performs transmission and reception operations conforming to IEEE802.11, a Bluetooth communication unit 32 that performs transmission and reception operations conforming to Bluetooth communication, and a control circuit 37 that controls the communication operations in both the communication units 31 and 32. The same signal lines as above allowing the wireless LAN communication unit 31 and the Bluetooth communication unit 32 to recognize states thereof each other are connected between the communication units 31 and 32.

The wireless LAN communication unit 31 and the Bluetooth communication unit 32 include two transmission/reception ports P1 and P2 for inputting and outputting high-frequency waves, respectively. The transmission/reception ports P1 are connected to an antenna for diversity transmission and reception 35 via a power divider/combiner 33. The other reception ports P2 are connected to an antenna for diversity transmission and reception 36 via a power divider/combiner 34. Therefore, both the wireless LAN communication unit 31 and the Bluetooth communication unit 32 can perform selective diversity transmission and reception operations using the two shared antennas 35 and 36.

The power divider/combiner 33 is, for example, a power divider/combiner of the Wilkinson type. The power divider/combiner 33 is designed to have an isolation characteristic between the wireless LAN communication unit 31 and the Bluetooth communication unit 32. Specifically, the power divider/combiner 33 substantially equally distributes reception power in the antenna 35 to the respective transmission/reception ports P1 of the wireless LAN communication unit 31 and the Bluetooth communication unit 32, substantially equally distributes transmission power from the transmission/reception port P1 of the wireless LAN communication unit 31 to the antenna 35 and the transmission/reception port P1 of the Bluetooth communication unit 32, and, then, cancels the power distributed to the transmission/reception port P1 of the Bluetooth communication unit 32. The power divider/combiner 33 substantially equally distributes transmission power from the transmission/reception port P1 of the Bluetooth communication unit 32 to the antenna 35 and the transmission/reception port P1 of the wireless LAN communication unit 31 and, then, cancels the power distributed to the transmission/reception port P1 of the wireless LAN communication unit 31. The same holds true for the isolation characteristic of the power divider/combiner 34.

Both the two communication systems use the same frequency band, that is, the ISM band but do not have compatibility. Thus, when the user attempts to perform communication using both the communication systems simultaneously, the communication systems interfere with each other to cause radio interference and reception failure. When one transceiver outputs strong high-frequency power near the other transceiver, it is likely that an RF reception circuit of the other transceiver is permanently damaged. Thus, during operation of one transceiver, the other transceiver has to be stopped. Thus, the control circuit 37 switches, during a period in which one transceiver is performing transmission using one shared antenna, the other transceiver to a reception operation in which the other shared antenna is used. Consequently, radio interference is prevented and simultaneous operation of the transceivers is realized as described above.

When the wireless LAN communication unit 31 is outputting a high-frequency signal on a specific channel from, for example, the transmission/reception port P1 to another wireless communication apparatus, the control circuit 37 detects the signal and sets a reception antenna of the Bluetooth communication unit 32 to the transmission/reception port P2. Consequently, the Bluetooth communication unit 32 is capable of receiving a radio wave of another Bluetooth wireless communication apparatus. Since the power divider/combiner 34 has the isolation characteristic between the wireless LAN communication unit 31 and the Bluetooth communication unit 32, even if the wireless LAN communication unit 31 outputs the high-frequency signal from the transmission/reception port P1, a reception function of the Bluetooth communication unit 32 is not permanently damaged. It is possible to reduce a degree of reception interference.

On the other hand, when the Bluetooth communication unit 32 is outputting a high-frequency signal on a specific channel from, for example, the transmission/reception port P1 to another wireless communication apparatus, the control circuit 37 detects the signal and sets a reception antenna of the wireless LAN communication unit 31 in the transmission/reception port P2. Consequently, the wireless LAN communication unit 31 is capable of receiving a transmission signal from another wireless LAN communication apparatus. Since the power divider/combiner 33 has the isolation characteristic between the wireless LAN communication unit 31 and the Bluetooth communication unit 32, even if the Bluetooth communication unit 32 outputs the high-frequency signal from the transmission/reception port P1, a reception function of the wireless LAN communication unit 31 is not permanently damaged. It is possible to reduce a degree of reception interference.

Figure 6:
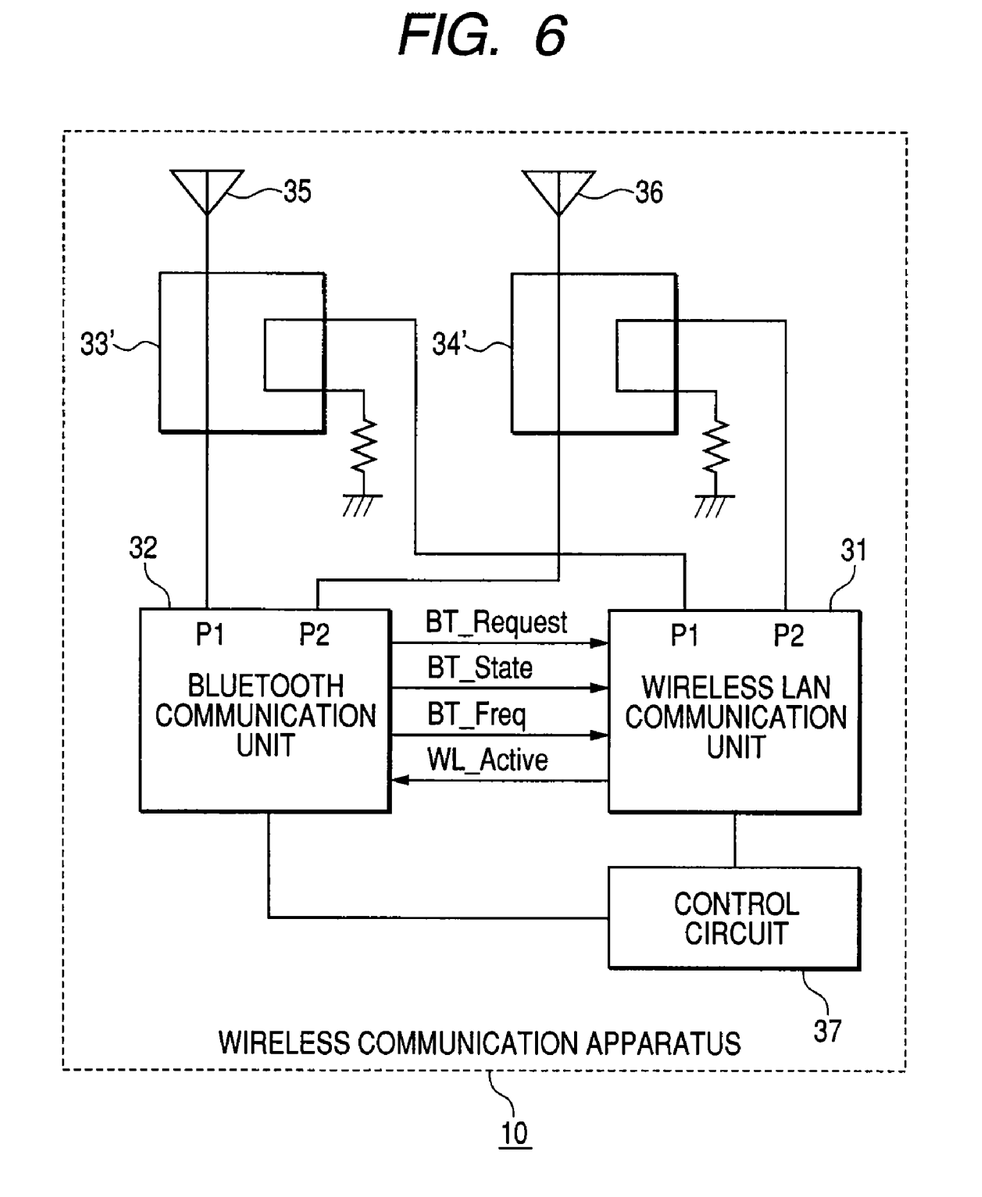
FIG. 6 is a diagram showing a modification of the wireless communication apparatus in FIG. 5 in which a directional coupler is used for connection of a shared antenna and respective transceivers.

As a device for connecting the wireless LAN communication unit 31 and the Bluetooth communication unit 32 to the shared antenna 14 to have the isolation characteristic between the communication units 11 and 12, it is also possible to use directional coupler 33' and 34' other than the Wilkinson-type power divider/combiners 33 and 34. An example of a structure of the wireless communication apparatus 10 in this case is shown in FIG. 6. A coupling operation for transmission and reception power by the directional coupler 33' or 34' is substantially equivalent to power distribution and combination actions by the power divider/combiner 33. Operations of the wireless LAN communication unit 31, the Bluetooth communication unit 32, and the control circuit 37 are the same as those described above. Thus, further explanations of the operations are omitted.

In this specification, IEEE802.11 and Bluetooth communication are described above as the incompatible two communication functions mounted on the wireless communication apparatus. However, it is also possible to apply the present embodiments to combinations of other communication functions.

According to the embodiments, it is possible to provide an excellent wireless communication apparatus that can be suitably mounted with two different communication functions that use an identical frequency band like the wireless LAN represented by IEEE802.11 and the Bluetooth communication.

According to the embodiments, it is possible to provide an excellent wireless communication apparatus that can be suitably mounted with two incompatible communication functions like the wireless LAN represented by IEEE802.11 and the Bluetooth communication and can simultaneously use the two communication functions without causing radio interference. In the wireless communication apparatus according to the embodiments, it is unnecessary to completely stop the function of one of the transceivers conforming to the incompatible two communication standards. It is possible to simultaneously operate both the transceivers.

It should be understood by those skilled in the art that various modifications, combinations, sub-combinations, and alterations may occur depending on design requirements and the other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wireless communication apparatus having wireless communication functions conforming to incompatible first and second communication standards, wherein the first communication standard is IEEE802.11 and the second communication standard is Bluetooth communication, the wireless communication apparatus comprising:

a first transceiver that performs a wireless communication operation conforming to the first communication standard and that includes a first transmission/reception port for inputting and outputting transmission and reception signals;

a second transceiver that performs a wireless communication operation conforming to the second communication standard and that includes a second transmission/reception port for inputting and outputting transmission and reception signals;

a shared antenna shared by the first and the second transceivers for transmission and reception;

an antenna connecting unit that connects the shared antenna and the first and the second transmission/reception ports; and a control unit that controls the communication operations in the first and the second transceivers such that the first and the second transceivers operate simultaneously, wherein the antenna connecting unit:

(i) equally distributes reception power of a reception signal in the shared antenna to the first and the second transmission/reception ports, (ii) distributes first transmission power of a first transmission signal from the first transmission/reception port to the shared antenna and the second transmission/reception port, wherein the second transmission/reception port is isolated from the first transmission power of the first transmission signal distributed from the first transmission/reception port resulting from cancellation of the first transmission power of the first transmission signal, and (iii) distributes second transmission power of a second transmission signal from the second transmission/reception port to the shared antenna and the first transmission/reception port, wherein the first transmission/reception port is isolated from the second transmission power of the second transmission signal distributed from the second transmission/reception port resulting from cancellation of the second transmission power of the second transmission signal.

2. A wireless communication apparatus according to claim 1, wherein when one transceiver is switched to performing a transmission, the control unit switches the other transceiver/ to a reception operation.

3. A wireless communication apparatus according to claim 1, wherein the antenna connecting unit includes a power divider/combiner of a Wilkinson type.

4. A wireless communication apparatus according to claim 1, wherein the antenna connecting unit includes a directional coupler.

5. A wireless communication apparatus according to claim 1, wherein the first transceiver includes a first antenna for selective diversity reception connected through a first reception port and is capable of performing a selective diversity reception operation using the first antenna for selective diversity reception and the shared antenna, and the second transceiver includes a second antenna for selective diversity reception connected through a second reception port and is capable of performing a selective diversity reception operation using the second antenna for selective diversity reception and the shared antenna.

6. A wireless communication apparatus according to claim 5, wherein the control unit sets, when one transceiver is performing a transmission operation using the shared antenna, the antenna for selective diversity reception of one transceiver as the shared antenna.

* * * * *